(12) United States Patent
Mathur et al.

(10) Patent No.: US 9,448,789 B2
(45) Date of Patent: Sep. 20, 2016

(54) METHOD OF CONSOLIDATING, SYNCHRONIZING, AND STREAMING PRODUCTION CONTENT FOR DISTRIBUTED EDITING OF MEDIA COMPOSITIONS

(71) Applicant: Avid Technology, Inc., Burlington, MA (US)

(72) Inventors: Shailendra Mathur, Beaconsfield, CA (US); Robert M. Brown, Jr., Sunnyvale, CA (US); Robert N. Stabler, Madison, WI (US)

(73) Assignee: Avid Technology, Inc., Burlington, MA (US)

( * ) Notice: Subject to any disclaimer, the term of this patent is extended or adjusted under 35 U.S.C. 154(b) by 1 day.

(21) Appl. No.: 14/676,888

(22) Filed: Apr. 2, 2015

(65) Prior Publication Data
US 2015/0286477 A1 Oct. 8, 2015

Related U.S. Application Data

(60) Provisional application No. 61/975,548, filed on Apr. 4, 2014.

(51) Int. Cl.
*G06F 9/44* (2006.01)
*G06F 17/30* (2006.01)
*G06Q 10/10* (2012.01)
*H04L 29/06* (2006.01)
(Continued)

(52) U.S. Cl.
CPC .............. *G06F 8/70* (2013.01); *G06F 17/3005* (2013.01); *G06F 17/30575* (2013.01); *G06Q 10/10* (2013.01); *G06Q 10/101* (2013.01); *G11B 27/031* (2013.01); *G11B 27/10* (2013.01); *H04L 65/403* (2013.01); *H04L 67/1095* (2013.01); *H04L 67/42* (2013.01); *H04N 21/85406* (2013.01)

(58) Field of Classification Search
CPC .............. G06Q 10/10; G06F 17/3005; G06F 17/30575; G11B 27/00; G11B 27/022
See application file for complete search history.

(56) References Cited

U.S. PATENT DOCUMENTS 6,662,357 B1 * 12/2003 Bowman-Amuah ..... G06F 8/20
717/120
2005/0268279 A1 * 12/2005 Paulsen ..................... G06F 8/38
717/110
(Continued)

FOREIGN PATENT DOCUMENTS

WO WO/2011/156514 12/2011

*Primary Examiner* — Chameli Das
(74) *Attorney, Agent, or Firm* — Oliver Strimpel (57) ABSTRACT

A synchronized media project, synchronization SDK, and synchronization service enable multiple users to produce a media composition collaboratively. A media project includes composition assets that reference media assets. A synchronization SDK enables multiple applications to edit the media project independent of an internal organization of the project. A project synchronization service synchronizes copies of media projects located on clients with a server-based versioned master project. User-selectable project synchronization modes determine whether media project assets are stored on clients, on the server, or on both, and when media assets are transferred. Synchronized media projects include composition assets in proprietary formats and in interoperable formats. Interoperable composition assets are rendered from proprietary composition assets on a track-by-track basis.

12 Claims, 9 Drawing Sheets (51) Int. Cl.
*H04L 29/08* (2006.01)
*G11B 27/031* (2006.01)
*G11B 27/10* (2006.01)
*H04N 21/854* (2011.01)

(56) References Cited

U.S. PATENT DOCUMENTS

| | | | | |
|---|---|---|---|---|
| 2006/0059253 A1* | 3/2006 | Goodman | ............... | G06Q 10/10 |
| | | | | 709/223 |
| 2008/0184098 A1* | 7/2008 | Chen | ................ | G06F 17/24 |
| | | | | 715/202 |
| 2008/0288624 A1* | 11/2008 | Armangil | ............. | G06F 9/541 |
| | | | | 709/223 |
| 2009/0006467 A1* | 1/2009 | Visscher | ................ | G06Q 10/06 |
| 2009/0172568 A1* | 7/2009 | Arthursson | ......... | G06F 9/45504 |
| | | | | 715/762 |
| 2012/0089499 A1* | 4/2012 | Balthaser | ................ | G06F 17/24 |
| | | | | 705/35 |
| 2012/0233555 A1 | 9/2012 | Psistakis et al. | | |
| 2014/0040737 A1 | 2/2014 | Guerrera et al. | | |
| 2014/0044413 A1* | 2/2014 | Wallace | ............... | H04N 9/8205 |
| | | | | 386/278 |
| 2014/0157113 A1* | 6/2014 | Krishna | ................ | G06F 17/289 |
| | | | | 715/249 |
| 2014/0280463 A1* | 9/2014 | Hunter | ................ | G06Q 10/101 |
| | | | | 709/203 |
| 2015/0032697 A1* | 1/2015 | Abdo | ................ | G06F 17/30017 |
| | | | | 707/634 |
| 2015/0095783 A1* | 4/2015 | Lussier | ................ | G11B 27/034 |
| | | | | 715/723 |

* cited by examiner

METHOD OF CONSOLIDATING, SYNCHRONIZING, AND STREAMING PRODUCTION CONTENT FOR DISTRIBUTED EDITING OF MEDIA COMPOSITIONS

CROSS REFERENCE TO RELATED APPLICATION

This application claims right of priority to and the benefit under 35 U.S.C. §119(e) of U.S. provisional patent application Ser. No. 61/975,548, filed Apr. 4, 2014, which is incorporated herein by reference.

BACKGROUND

Media productions are increasing in complexity; with the proliferation of media capture devices and locations, addition of ever more types of metadata associated with the media, and the growing diversity of audiences, locations, and platforms associated with media consumption. In time-sensitive production environments, an additional challenge is the speed with which media is expected to traverse the workflow from capture in the field, through the editing and rendering phases, to broadcast or streaming to the consumer. To meet these challenges, media production teams work in an increasingly decentralized manner, working from a variety of locations, some of which are served only by low bandwidth connections. In order to enable far-flung teams to work together effectively and rapidly, various challenges relating to synchronization, media sharing, and media consolidation must be overcome.

SUMMARY

In general, the methods, systems, and computer program products described herein provide methods of consolidating, synchronizing, and streaming media assets for a synchronized media projects in a way that is transparent to the creative applications used by the media composition team. Multiple users, remote from each other, may produce media projects collaboratively, sharing compositional and media assets.

In general, in one aspect, a method of editing a media project that is at least partially stored on a client, the media project comprising at least one of a composition asset and a media asset, comprises: enabling a user of an application running on the client to use the application to edit the media project, wherein the application communicates with the media project via a software development kit, such that the application is able to edit the media project independently of an internal organization of the media project; and designating a synchronization mode for the media project that specifies whether: composition assets are to be stored on the client and not on a server, or stored on the server and not the client, or stored on both the client and on the server; and media assets are to be stored on the client and not on the server, or stored on the server and not the client, or stored on both the client and on the server; and providing a project synchronization service, wherein the media project stored on the client and a copy of the media project stored on the server are synchronized with each other in accordance with the designated synchronization mode.

Various embodiments include one or more of the following features. The media project includes a composition asset in a format that is proprietary to the application. The media project includes a composition asset in an interoperable format. The synchronization mode is changed automatically when at least one of: the client is connected to a network after being disconnected from the network; and the client is disconnected from a network after being connected to the network. Enabling a user of an application running on a second client to use the application to edit a copy of the media project that is at least partially stored on the second client, wherein the copy of the media project is synchronized to the first-mentioned media project via the server using the synchronization service in accordance with a synchronization mode designated for the copy of the media project. The designated synchronization mode specifies that media assets are to be stored on the server and not on the client, further comprising streaming a media asset to the client when the media asset is required by the application. Streaming a media asset to the client when the media asset is required by the application but is not present on the client. The media project includes a plurality of versions. The interoperable compositional asset references a playlist. The application is able to determine whether a media asset is present on the client.

In general, in another aspect, a method of storing a synchronized media project comprises: on a client, storing metadata for the synchronized media project, the metadata comprising: compositional reference map, wherein the compositional reference map refers to: a set of asset records, each asset record referring to a location and a synchronization state for a corresponding asset; and a synchronization mode; on the client, providing a bidirectional project synchronization service, the synchronization service issuing data and notifications to a server and receiving data and notifications from the server for maintaining synchrony between assets of the synchronized media project stored on the client and assets of the synchronized media project stored on the server enabling a user of an application hosted by the client to select the synchronization mode for the synchronized media project, the synchronization mode specifying whether: the bidirectional project synchronization service maintains synchrony between client and server copies of the one or more composition assets; and the bidirectional project synchronization service maintains synchrony between client and server copies of the media assets.

Various embodiments include one or more of the following features. The application is able to read from the synchronized media project and write to the synchronized media project in a manner that is independent of a storage location of the assets of the synchronized media project. The application is able to read from the media project and write to the media project in a manner that is independent of whether any given asset if stored on the client or stored on the server. The assets of the synchronized media project include a composition asset in a format that is proprietary to the application. The assets of the synchronized media project include an interoperable composition asset. The assets of the synchronized media project include at least one proprietary format composition asset and at least one interoperable composition asset.

In general, in a further aspect, a client system comprises: a memory for storing computer-readable instructions; and a processor connected to the memory, wherein the processor, when executing the computer-readable instructions, causes the client system to perform a method for editing a media project that is at least partially stored on the client system, the media project comprising at least one of a composition asset and a media asset, the method comprising: enabling a user of an application running on the client system to use the application to edit the media project, wherein the application communicates with the media project via a software development kit, such that the application is able to edit the media project independently of an internal organization of the media project; and designating a synchronization mode for the media project that specifies whether: composition assets are to be stored on the client and not on a server, or stored on the server and not the client, or stored on both the client and on the server; and media assets are to be stored on the client and not on the server, or stored on the server and not the client, or stored on both the client and on the server; and providing a project synchronization service, wherein the media project stored on the client and a copy of the media project stored on the server are synchronized with each other in accordance with the designated synchronization mode.

In general, in yet another aspect, a computer program product comprises: a non-transitory computer-readable medium with computer program instructions encoded thereon, wherein the computer program instructions, when processed by a client, instruct the client to perform a method of editing a media project that is at least partially stored on the client, the media project comprising at least one of a composition asset and a media asset, the method comprising: a user of an application running on the client to use the application to edit the media project, wherein the application communicates with the media project via a software development kit, such that the application is able to edit the media project independently of an internal organization of the media project; and designating a synchronization mode for the media project that specifies whether: composition assets are to be stored on the client and not on a server, or stored on the server and not the client, or stored on both the client and on the server; and media assets are to be stored on the client and not on the server, or stored on the server and not the client, or stored on both the client and on the server; and providing a project synchronization service, wherein the media project stored on the client and a copy of the media project stored on the server are synchronized with each other in accordance with the designated synchronization mode.

DETAILED DESCRIPTION

When the production of a media project is distributed over team members in diverse locations using a variety of devices and creative applications, and with variable bandwidth connections between the devices, a number of problems arise.

First, in such settings, the media assets may not be co-located with any of the editing team members, but instead may be stored in diverse locations. Media creation and editing applications usually have their own, non-interchangeable methods of referencing compositions and the assets used in media productions. Each application places the working compositions and its associated assets in a location specified by that application, whether it be on the local client machine hosting the application or at one or more other locations. If the project data has to be shared with other applications and collaborators, it becomes necessary to store the composition and source assets in a consolidated structural form that is independent of the actual storage location of the data, whose storage locations would otherwise be specified with respect to a local file system or a remote object database.

Another challenge arises when the production content needs to be transported between applications using physical media or via an interconnecting network. This arises from the differences between applications in the way they handle content. For example, some applications address production content as a single unit, such as a single-file zip bundle, while others handle the content as a serial set of individual constituent objects that are reconstituted into the original form once received. When the sending and receiving applications adopt different content addressing methods, a solution is needed to make the transport and exchange of production content coherent. Existing solutions involve the use of predefined structural relationships among assets that help processes operating on the production assets to locate and manipulate individual assets while adhering to rules defined by the data model underlying the structure. This enables manipulations such as incremental addition, incremental updates, merges, or deletion of assets in a production to be performed while maintaining coherency of the structures.

When multiple applications or client machines are used to work on the same production in parallel with each other, a synchronization challenge arises. Each of the clients must be able to view the consolidated, up-to-date view of the production content, whether the content is located on a local file system or on a server-based object database. Furthermore, each client needs to have access to the current, updated version of each asset that is to be incorporated into the composition.

An additional challenge involves bandwidth. Especially when applications have low bandwidth connections, sharing a full copy of the media assets among project collaborators can introduce unacceptable latency, consume all the available bandwidth, and in some cases drive up connection costs.

In the methods described herein, these collaborative media project challenges are addressed using project synchronization methods that involve a project synchronization service that runs on each client and manages the exchange of data and notifications with a back end server, as well as a project synchronization software development kit (SDK) that enables media creation and editing applications to interact with synchronized media projects. The methods may be applied to existing media project formats, including formats based on standards such as the AMWA AS-02 implementation of MXF, IMF, DCP, Sony® XDCAM®, and AVCHD. However, such media and composition exchange formats typically apply to very constrained use cases, such as camera acquisition, delivery, and media interoperability on physical storage. The methods may also be applied to media projects whose structure is determined by a particular media editing application, such a video editing application, or a digital audio workstation. As used herein, a video editing application refers to a software application running on a client and/or a server that enables a user to create, edit, import, export, and store digital video and its associated audio, special effects, and metadata. An example of such a video editing application is Media Composer® from Avid® Technology, Inc. of Burlington, Mass., described in part in U.S. Pat. Nos. 5,267,351, 5,355,450, and 5,930,445, which are incorporated herein by reference. As used herein, a digital audio workstation refers to a software application and/or a hardware system for recording, editing, and storing digital audio. An example of such a digital audio workstation is Pro Tools®, also from Avid Technology, Inc. Media editing applications may be hosted locally on a client or in a client-server or cloud-based environment.

The described methods may further be applied to media projects that involve a particular company's way of structuring collaboration assets between its various media editing or media management applications. As used herein, an asset refers to an element that forms part of a media project, including: a composition, which may be a metadata file that references other assets; media that may include video clips, audio clips, graphics; and special effect data. An example includes the structuring of media projects and assets by a media asset management system, such as Interplay®|Production and Interplay®|MAM from Avid Technology, Inc.

The described project collaboration and synchronization methods may further be applied to media projects that are internally organized in a generic format that does not conform to a pre-specified standards-based or proprietary media project format, and that provides a structured representation of various creative tool compositions, assets, and metadata elements in a form that is optimized for the media production environment. An example of such a generic media project format is the Production Exchange Format (PXF) from Avid Technology Inc. As the name implies, this format is designed for the exchange and preservation of content among multiple applications that are typically part of the pre-production, production, and post-production stages of media creation. While existing media project formats are constrained by the need to be independent of the particular creative applications used during these production stages, PXF extends these formats to include application-dependent assets. With PXF, constituent objects refer to other objects; for example, compositions refer to physical assets which they use. Such levels of indirection confers a flexibility that is valuable in media production environments where constant changes are being made.

Once media projects are registered with a server and become subject to the described media project synchronization methods, various advantages accrue. These include: avoiding media duplication, since the same media location may be used by multiple creative applications; creating multiple versions of each new asset; each creative application being able to work with its own proprietary composition without being aware of other compositions and other media being present; providing a user of a given creative application access to media used by other creative applications; working on interoperable compositions and rendering the result as new interoperable compositions from within each creative application; synchronizing the physical assets of each creative application to a back end server and/or to another client.

Figure 1:
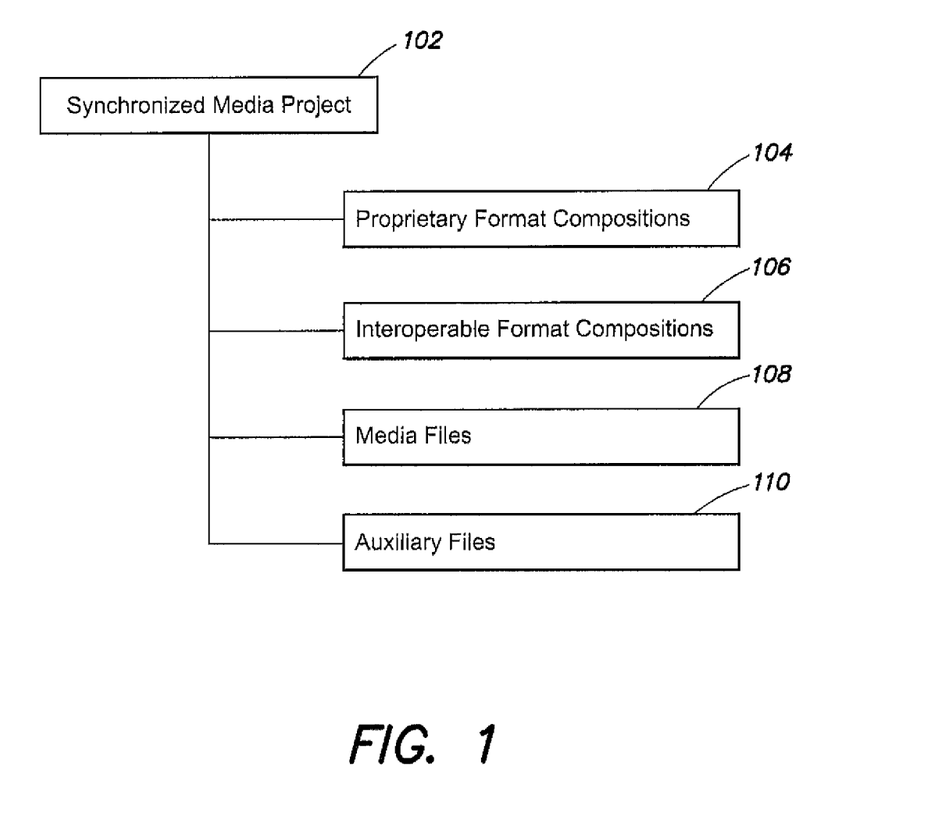
FIG. 1 is a high level conceptual diagram of the contents of a synchronized media project.

At a conceptual level, a media project, whether it has a pre-specified format or a production-optimized generic format such as the PXF format, may include one or more of the elements illustrated in FIG. 1, though a media project may even be defined without any of the illustrated elements being present. Further details on the internal structure of a media project, and its constituent compositions, are discussed below in connection with FIGS. 5 and 6.

Referring to FIG. 1, synchronized media project 102 may include one or more proprietary format compositions 104. These include the full data model of a media composition in a form that is native to a creative application, such as a video editing application, a digital audio workstation, or a special effects application. Typically, these include data that may only be used by that specific application. By contrast, interoperable format compositions 106 are created by rendering a simplified version of the composition from a proprietary format composition, such as by excluding certain tracks, or by rendering or freezing other tracks. More than one interoperable composition may be present. Such compositions are designed to be playable, and possibly even edited to some extent by a range of applications in addition to the one or more that were used to create/edit it. Media projects may also include assets such as media files 108 and auxiliary files 110. Prior to inclusion within media project 102, such assets may be organized in a bundle-type folder structure or exist as individual objects of any type, such as a video clip, an audio clip, a document, or an image in various locations on a local file system or on another client or on a cloud-based server. Once the project synchronization methods described herein are invoked by a media project registration process, such individual objects and/or bundles become part of a media project that may be synchronized, shared, and edited in a collaborative fashion, as described below.

Figure 2:
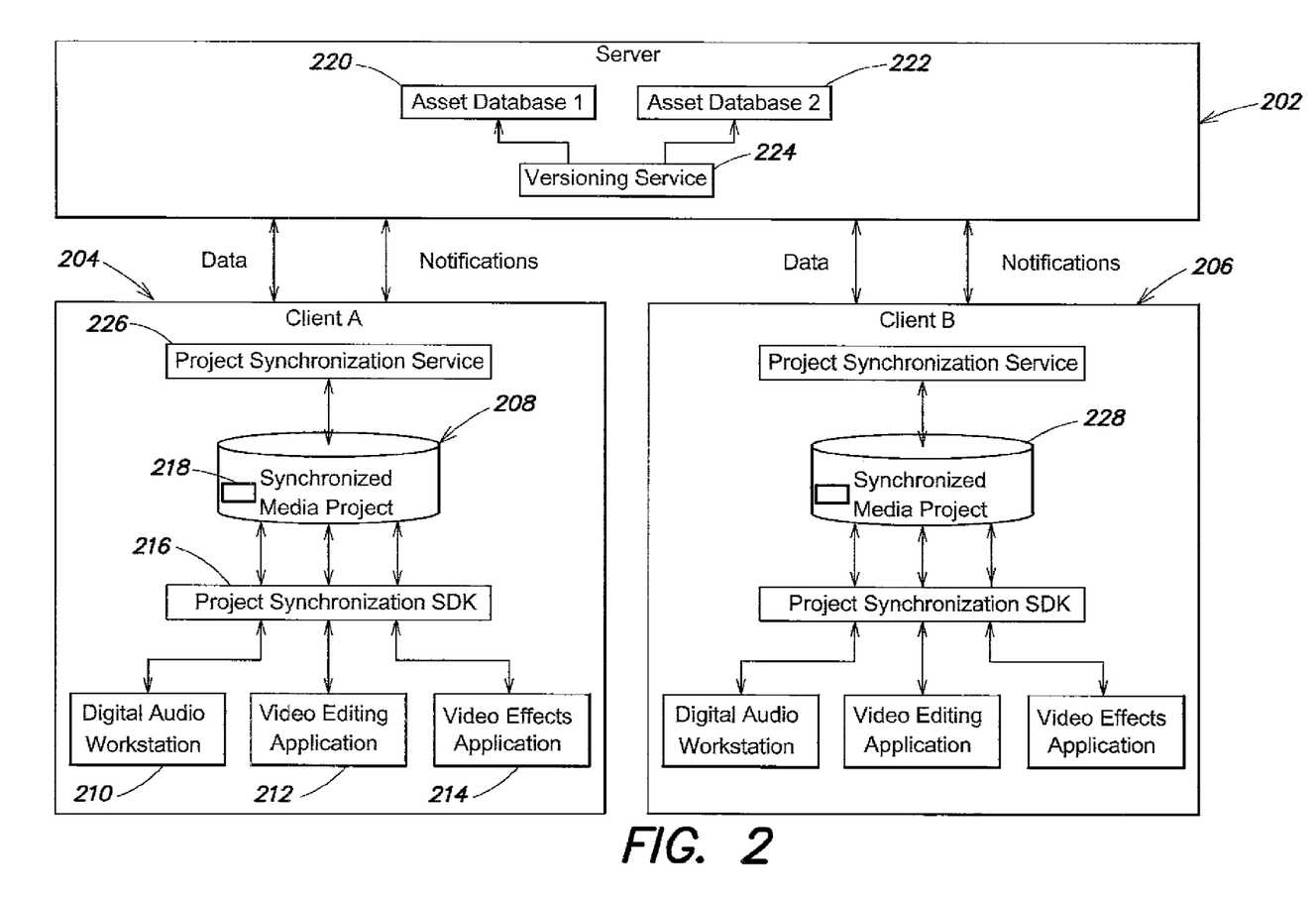
FIG. 2 illustrates an architecture for collaborative editing of synchronized media projects.

An illustrative architecture for media project synchronization among project collaborators is illustrated in FIG. 2. Cloud-based server 202 acts as a back end for synchronizing and storing media projects being edited at client workstations 204 and 206. At client A 204, a user may edit synchronized media project 208 using one or more creative applications, such as digital audio workstation 210, video editing application 212, and video effects application 214. Each application interacts with synchronized media project 208 via project synchronization SDK 216. This comprises a set of application program interfaces (APIs) that abstract out the actual representation and location of data within the synchronized media project, and allow creative applications 210, 212, and 214 to interact (including reading and writing) with synchronized media project 208 in a manner that is transparent to the user, but that maintains the internal structure of the synchronized media project. As discussed above, the internal structure may be pre-specified or generic. In addition, project synchronization SDK 216 includes reader/writer modules for each creative application that work with the APIs. Using reader modules, a creative application is able to read not only its own proprietary compositions (FIG. 1, 104), but also interoperable compositions (106) along with their component parts, such as video, audio, and data tracks. These reader/writer modules may also convert an interoperable composition into a proprietary composition of the application. The writing modules are used to render new interoperable compositions from an application's proprietary compositions, as described below.

Figure 3:
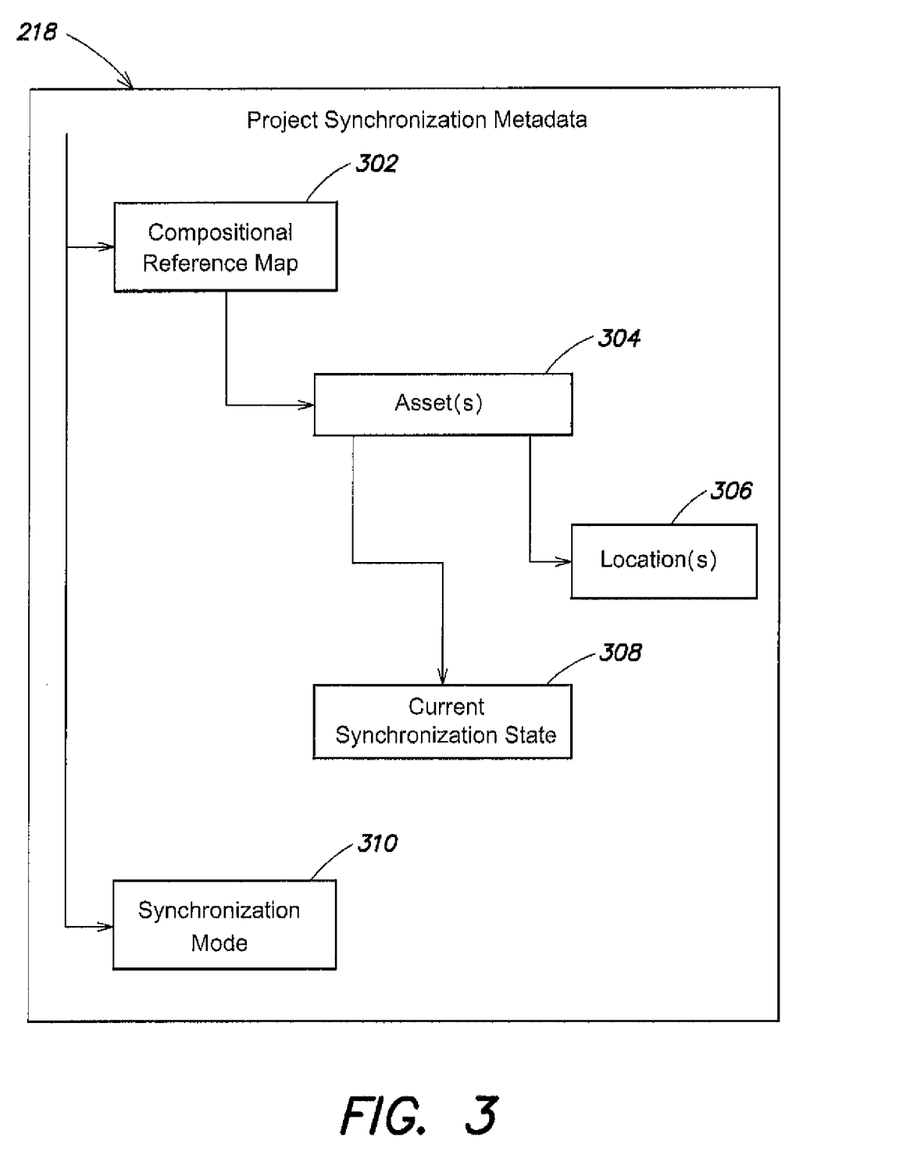
FIG. 3 illustrates a data structure for project synchronization metadata.

Metadata specifying the internal structure of a synchronized media project together with a list of assets and their storage locations, as well as other data that specifies the synchronized media project's state and synchronization mode, is stored as project synchronization metadata 218 as a file or folder that is an integral part of each synchronized media project. Each time a change is made to synchronized media project 208, the project synchronization SDK updates project synchronization metadata 218. For example, if a creative application is used to write an asset to the synchronized media project, the project synchronization SDK updates the project synchronization metadata with an identifier and location for the new asset. FIG. 3 illustrates a data structure for project synchronization metadata 218. It includes compositional reference map 302, which references assets 304, if any, that are part of synchronized media project 208. For each asset, the metadata also includes the asset's location 306 and its current synchronization state 308. The current synchronization state of the asset may not yet correspond to the desired state specified by the synchronization mode (Table 1). The synchronization service acts to make the current synchronization state conform to the desired synchronization state. The entries for storage location may have more than one entry for the same asset. The use of multiple locators for the same assets is described below. In addition, project synchronization metadata 218 includes a record of synchronization mode 310 to which the synchronized media project is assigned. The asset synchronization state and mode is discussed below.

Figure 4:
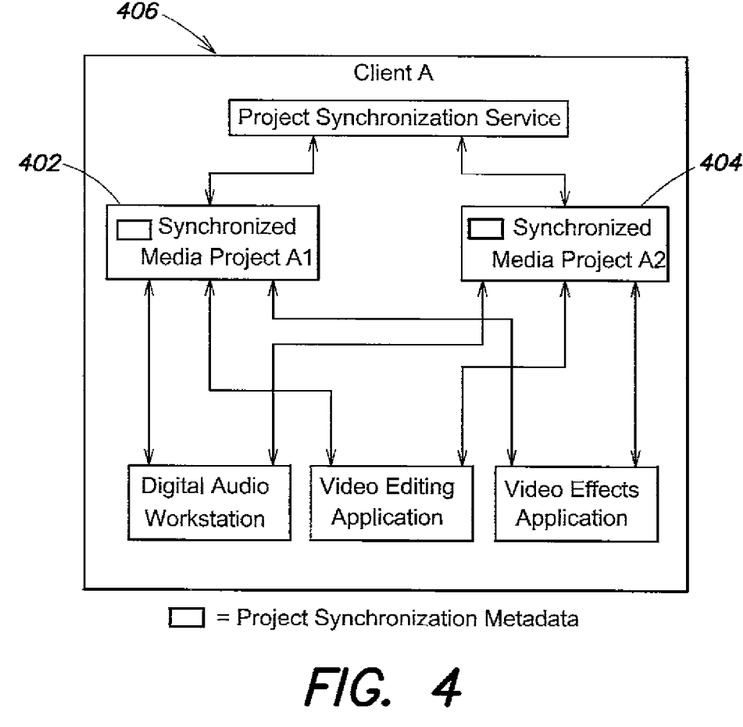
FIG. 4 illustrates collaborative editing of two synchronized media projects on a single client.

A given client may include more than one synchronized media project when a user is collaborating on more than one synchronized media project. The set of collaborators, synchronization state and synchronization mode is specific to each of the media projects, with each project having its own project synchronization metadata and synchronized media project data. This situation is illustrated in FIG. 4, which shows two synchronized media projects 402 and 404 on client 406.

A given synchronized media project is not restricted to single asset folder or bundle structure, but may point to multiple individual folders or bundles that are organized under a single root. In other words, it may have a bundle of bundles structure. Furthermore, each individual folder or bundle may initially be referenced to a location external to a client where the synchronized media project resides, and may later be moved under a common file system root location when the synchronized media project is consolidated. Consolidation is discussed below.

Synchronization of media projects is performed by project synchronization service 226 that maintains a master copy of each media project in server 202. This master copy is tracked by one or more asset databases 220, 222 in the server, while versioning service 224 keeps track of the changes made, and supports reversion to earlier versions. Thus, a copy of each media project may be stored in the form of records in a database located on the server. The server-based media project copy may not conform at any given moment to copies stored locally on clients, depending on the chosen synchronization mode for each project, and on the extent to which the synchronization service has been able to cause the actual state of the various synchronized media copies to conform to their desired state, as specified by the applicable synchronization mode. The versioning service also maintains a record of client systems that are currently referencing each synchronized media project, and is thus able to cause the server to issue notifications of changes to registered client systems. Meanwhile, each client with a synchronized media project has its own local project synchronization service 226 that monitors central master asset database(s) 220, 222, and determines whether objects in local synchronized media project 208 need to be synchronized (i.e., updated). If updating is required, the revised version is transferred to the client and added to the folder hierarchy of local synchronized media project 208 and project synchronization metadata 218 is updated to reflect the local synchronized media project content and state. Adding rather than overwriting the local file serves to avoid potential problems during simultaneous reads and writes. New or updated assets may be added to a synchronized media project as a result of synchronization with a central server. The asset may in turn have been previously uploaded to the central server as a result of synchronization with another client. Thus, a local project synchronization service that is watching a synchronized media project is able to react to changes, either by triggering actions, or by informing applications connected to it about the changes. Unlike a folder watch/change notification process performed by an operating system's file system, applications registered with a project synchronization service receive notifications of changes to an asset occurring on a server, even if no local representation of the asset is present yet. This removes the need for an application to determine whether it needs to listen to changes on both the server and the local file system, since the project synchronization service abstracts this process out, and provides what the application needs regardless of the location of the assets.

A synchronized media project uses predefined internal relationships that determine the relationships among the objects within the media project. These relationships serve to abstract out references to the media project as well as its constituent asset objects by storing three types of locator data within the media project hierarchy: local paths relative to the media project root location that are resolved to mounted local paths by the application; unique material IDs that are used as an index to look up the actual locations of objects (e.g., composition files or source media files); and Uniform Resource Identifiers (URIs) that refer to remote locations of objects, including objects located on a central server or objects that are on other parts of the file systems. Whether assets not located within the media project are copied to the media project or streamed is an aspect of the project synchronization service that is determined by the specified synchronization mode 310.

The compositional assets in a media project are relatively small in size, as they consist of various parameters and data pointing directly or indirectly to media assets that form part of the composition. On the other hand, the media assets themselves, i.e., the video and audio files, tend to be large. For this reason, the described project synchronization service is able to treat compositional assets differently from media assets, sometimes uploading, downloading, and making copies of the former, but not of the latter.

Using the methods described above, synchronized media projects may exist in a variety of states but still be inspected and manipulated by applications agnostic of the current state of the assets within the media project. The synchronization mode, which is generally chosen by a user working on the synchronized media project, determines the state in which media projects are stored and circumstances under which client and server compositional and media assets are synchronized. Applications can work with the individual compositional and media asset information in a production without being aware of the actual location of the assets. Synchronized media project modes includes the following. (i) A local synchronized media project provides a local file system-based representation when the client is working in a disconnected mode. (ii) A server-based remote media project synchronization mode enables an application to access objects directly from a remote server, without making a local file-system copy. (iii) A local synchronized media project synchronized to a remote server-based media project uses the project synchronization service to keep the client and server-based objects synchronized. Both compositional and media assets are synchronized, but on-demand synchronization may occur in order to minimize media transfers. (iv) A local synchronized media project synchronized with multiple other computers uses project synchronization services on each of the clients to keep the local objects synchronized with the server-based master versioned database. (v) A local composition-only synchronized media project with media assets streamed remotely: media files are not delivered locally during synchronization. Instead, the remote URIs are used to stream media assets from servers to the applications directly in realtime as and when they are needed. The various modes and the corresponding synchronized media project states are summarized in Table 1:

TABLE 1

| | State | |
|---|---|---|
| Synchronization Mode | Stored On Client | Stored On Server |
| (i) Local | CA, MA | |
| (ii) Server-based | | CA, MA |
| (iii) Local media project synchronized to remote server | CA, MA | CA, MA |
| (iv) Multiple clients | CA, MA | CA, MA |
| (v) Local composition only with streaming | CA | CA, MA |

CA = compositional asset
MA = referenced media asset file

When a user performs an edit operation on a composition of a synchronized media project, the system responds in a manner that depends on the mode assigned to the media project. For a local media project (i.e., mode (i) above), all changes are applied to update locally stored compositional assets. The media assets are already present on the local client, and no further action is required. If the edit results in adding media not previously used in the composition, the new media files will already have been downloaded and stored locally.

If the synchronized media project is being maintained in server-based mode (i.e., mode (ii)), the editing instructions are sent to the server where they are applied directly to the remote compositional asset, with no local copy being stored. The referenced media assets will already be present on the server. Any new media referenced as a result of the current editing will have been previously uploaded, or otherwise made available to the remote server. If collaborators are also editing the media project, their changes are also reflected on the server-based synchronized media project, and no synchronization is required.

In the case of a local synchronized media project synchronized to a remote server-based media project (i.e., mode (iii) above), when a change is made on the client, it is performed directly on the local copy of the compositional asset. Subsequently, the project synchronization service copies the change to the synchronized media project to the remote server. It also ensures that any media files referenced by the newly edited compositional asset are present on both the client and the server by performing any necessary uploads or downloads. Some or all of the media assets may only be synchronized on demand in order to minimize bandwidth and storage requirements, but when the assets are transferred, local copies are stored.

In the mode where a local synchronized media project is synchronized with multiple other clients (mode (iv) above), changes performed to compositional assets on any one of multiple clients are performed on the client's local copy, which also has a copy of the media files referenced by the composition. The changes are then copied to a master server-based synchronized media project. Each time the media project compositional asset is changed by any one of the clients, a new version is created and stored in the server-based synchronized media project. This ensures that no work is lost when users at different clients are working simultaneously. The project synchronization service copies changes to both the compositional assets and media assets performed on one of the clients to each of the other clients via the master server-based synchronized media project, thus maintaining full synchronization. As with a single client discussed above (mode (iii)), the timing of the media asset synchronization may be chosen to minimize bandwidth and storage requirements. The project synchronization service may also merge changes performed by different collaborators and written as different versions in the server-based master synchronized media project. To address the possibility of conflict, a locking procedure may be provided, such that the editing of a given portion of the composition is limited to a single collaborator. Alternatively, when editing in parallel is permitted, the project synchronization service may identify and reject conflicting changes.

In the local composition only media project with media assets streamed remotely (mode (v) above), changes performed on the client are written to the local copy, and subsequently synchronized with the server-based synchronized media project by the project synchronization service. If the set of media assets referenced is changed, the new assets must be present on the server, and no local copy is maintained. Changes to compositional assets being made on other clients are synchronized with the server, and the server-based project synchronization service then also writes the changes to the local copy of the compositional asset, but no local synchronization of the media assets is performed. When media assets are needed on the client, they are streamed on demand from the server.

The choice of the appropriate media project synchronization mode is based on the usage scenario. A locally stored media project is necessary when an editor is working on a system that has no connection to the network. This can arise both for practical reasons, e.g., no network is available, or for security reasons. A server-based remote synchronized media project may be the appropriate choice, for example, when a collaborator is informed that a media project containing compositions and assets has been made available for his project, but he wishes to review or work with the content without having to spend the time, or consume bandwidth or local disc space to transfer the contents to the client. A local synchronized media project synchronized to a remote server-based synchronized media project may be appropriate in the following scenario: a user working on a first client saves incremental versions of the compositions and assets he is editing into a bundle. Subsequently, the same user continues working on a different, second client, perhaps at a different location, on which the project synchronization service is also installed. The second client establishes a connection to the server, and the user chooses to continue work on the same compositions, picking up from his last version. The user selects the same synchronized media project, and the project synchronization service downloads to the local disc only the composition and associated assets related to the last version, retaining all other composition and source assets on the server. The local composition-only synchronized media project with media assets streamed remotely mode may also be appropriate to this same use case. In this case, only the compositional assets are downloaded, and the source assets are transferred only when the application references them, i.e., on demand, with just-in-time delivery. A local synchronized media project synchronized with multiple other computers would be deployed when two or more editors are collaborating. For example, when a first collaborator is working on a media project and saving new versions of the composition or adding new source assets related to the production, a second collaborator sees these changes appear dynamically on his local copy of the production synchronized media project.

Media project storage modes may change automatically when certain conditions are met. For example, an editor may start work without a network connection, saving assets to a local synchronized media project. Subsequent connection to the network may trigger a check of the synchronization state and a switch to mode (iii) in which the local synchronized media project is synchronized to the remote server/cloud. In another scenario, while media has not yet downloaded for a section of a composition, the streaming mode may be activated automatically, either for the section for which media is being downloaded, or for another section if the editor wishes to switch to that section.

In each of the usage scenarios described above, each version may correspond to an incremental editing change that is performed with a given end product in mind. For example, an editor may perform a color correction to a video clip, remove an unwanted object, or replace one clip with another one. In addition, versions may correspond to different end products in a family of versions belonging to a given composition. For example, the versions may correspond to a director's version, theatrical version, TV version, a foreign language version, an airplane version, or a version suitable for streaming onto a mobile device. In various scenarios, a synchronized media project may include a set of incremental editing versions for each of several end product versions. It may be desirable to separate versions corresponding to each end product into different synchronized media projects, especially when different teams are working on them. Versioning applies both to proprietary data models and to interoperable data models. While the master versioned server-based media project may retain all versions, a client-based synchronized media project may receive and/or retain only a subset of the complete version set available on the server.

The local project synchronization service at each client is responsible for updating the local media project in accordance with the desired type of media project synchronization mode—from local synchronized media project to server-based remote synchronized media project, or the hybrid options described above. As discussed above, the project synchronization service exposes APIs that enable the application to communicate with it. For example, the application is able to query the state of objects within the synchronized media project. The results of such a query may be displayed to the user, where the state of each object is indicated graphically or with a text annotation in a media status field associated with each object. For example, a green icon may indicate that media is present locally on the client, and yellow may indicate that the media is on the server. Via the APIs, each of the creative applications are also able to control the synchronization mode, either automatically, or under user control. A particular application may stipulate a particular synchronization mode. For example, a creative application that is not capable of reading streamed information may require the media to be present locally. Another application, such as a web-based editing system may always require media to be streamed. In a hybrid application, the choice of synchronization mode may be controlled by the user. For example, before a user's client is disconnected from the network, the user may require media to be cached locally. If rapid edits need to be performed when high network bandwidth is not available, the user may choose the streaming synchronization mode. Alternatively, the user may elect to let the project synchronization service perform its own determination of how to synchronize media. Depending on how the synchronized media project has been synchronized, the service determines whether media required by a given creative application is available to be read locally, streamed from a remote location, or fetched on demand.

As mentioned above, synchronized media projects include compositions represented by one of two basic kinds of data model—proprietary and interoperable (FIG. 1: 104, 106). Proprietary data models represent compositions in a form that is native to a particular creative application, such a non-linear video editing application (FIG. 2, 212), a digital audio workstation (210), or a video effects application (214). Interoperable data models include simplified versions of the composition rendered to simple forms that map easily to a lowest common denominator compositional form composed of time-based representations of sequences, tracks, clips, and their sources. These interoperable data models make it easy for other applications that support this model to translate the result for playback on other systems having incompatible native compositional data models for simplified editing, sharing, or archiving purposes. Interoperable data models may also be generated for delivery to a mastering facility, a record company, a long term archive, a downstream contributor, or a marketplace. A given media project may include no such models, one, or multiple interoperable data models. Methods of generating interoperable compositions from proprietary compositions are discussed below.

Figure 5:
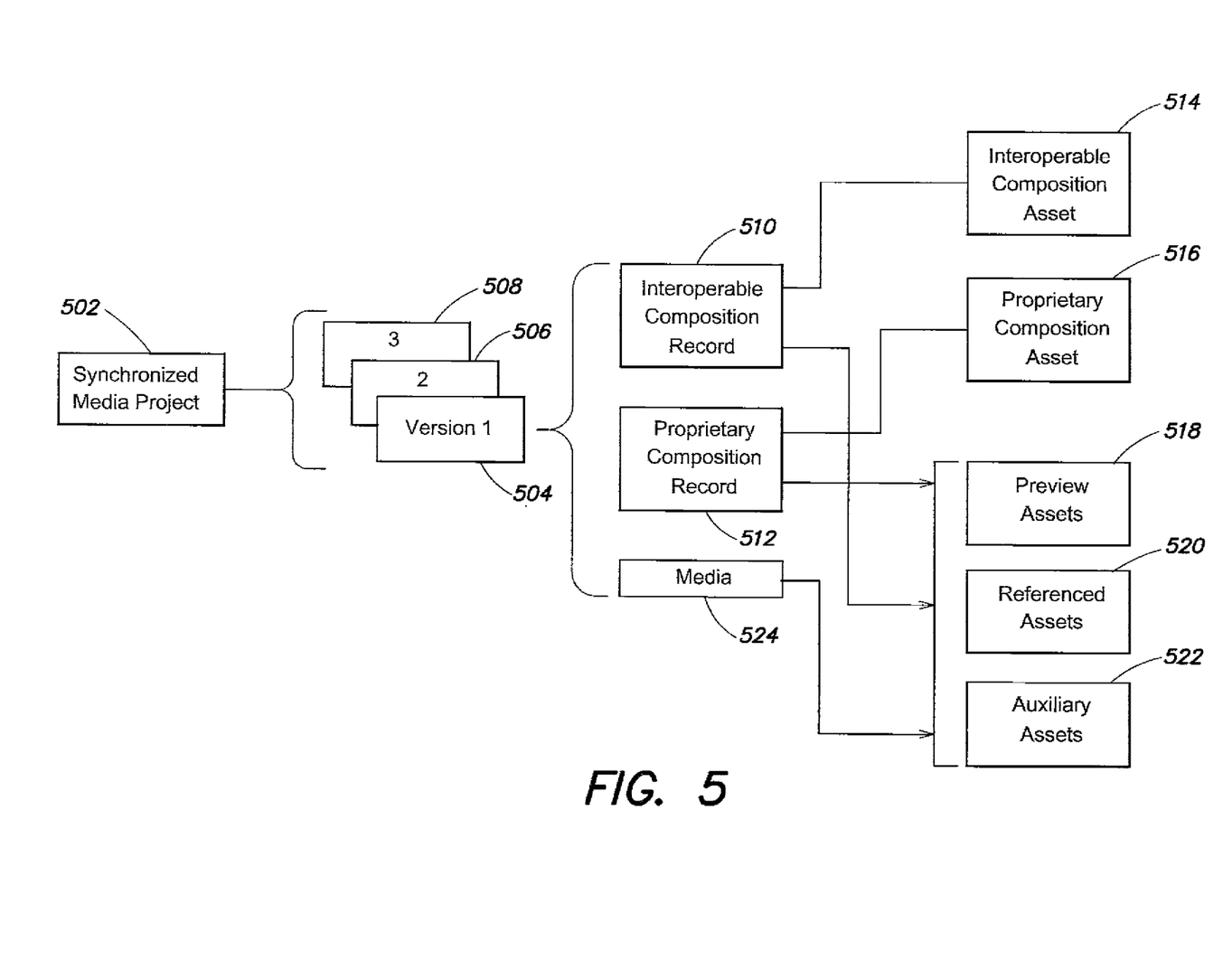
FIG. 5 illustrates a data model for a synchronized media project.

A data model for a media project is illustrated in FIG. 5. Synchronized media project 502 includes a set of different versions 504, 506, 508, each of which represents the content of the media project after an editing session to which the version corresponds. Thus after each edit session, a new version is created. Each version may (but also may not) include one or more interoperable composition records 510 and one or more proprietary composition records 512. In the data model, a composition record is a text-based description, e.g., stored in Extensible Markup Language (XML), about a particular object. Each composition record entry includes a locator pointer, such as a unique ID or a URL that points to a corresponding composition asset. As illustrated in the figure, interoperable composition record 510 points to interoperable composition asset 514, which is represented by a simplified data model in the form of a standard composition playlist as discussed below with reference to FIG. 6. Proprietary composition asset 516 contains structural metadata that is opaque to applications other than the one that created it, and it may include arbitrary relationships between the media assets. The synchronized media project requires the corresponding proprietary application to be running in order to access the proprietary composition asset and to be able to use the required media assets. Even without the proprietary application available, the record entries in the project synchronization metadata for the proprietary composition stores locators of the physical asset it uses. This enables users of the media projects to track the physical assets of each composition, even if they cannot open the compositions to derive such relationships. This facilitates improved asset management. For example locally synchronized physical media are not deleted if referenced by another composition asset. In addition, collaboration is enhanced. An example of this is the ability to reuse a media asset referenced by another proprietary composition without having to create a copy.

Assets generally refer to files containing the data used in the production by the editing application, though media files and other data files are also stored as assets. Each asset is given a unique ID, which may be randomly generated, that is used to reference it and link it to the media project. Compositions also point to corresponding preview assets 518, referenced assets 520, and auxiliary assets 522. Each version also includes a list of media 524, which also references preview assets 518, referenced assets 520, and auxiliary assets 522.

Figure 6:
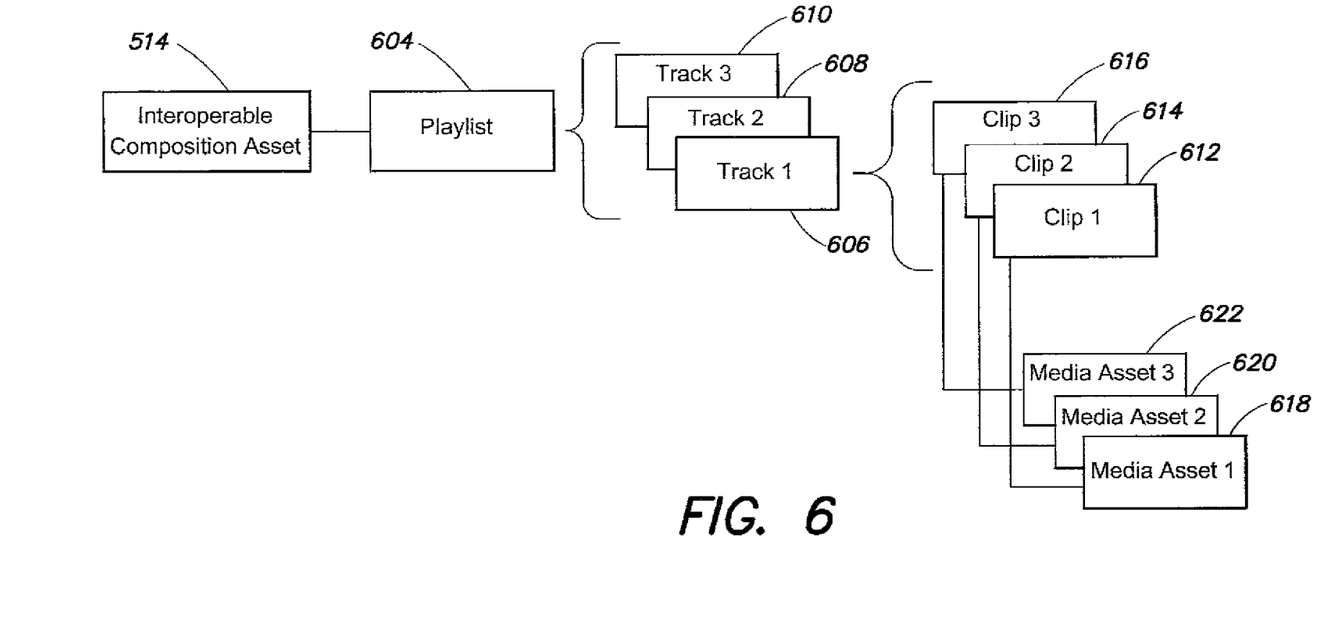
FIG. 6 illustrates a data model for an interoperable composition asset.

The playlist data model used for interoperable composition assets is illustrated in FIG. 6. Interoperable composition assets reference playlists. For example, interoperable composition asset 514 references playlist 604, which includes tracks 606, 608, and 610. Tracks may include video, audio, or data (i.e., non-media data). Each track references a set of clips, illustrated in the FIG. 6 as Clip 1 612, Clip 2 614, and Clip 3 616. Each clip in turn references corresponding media assets 618, 620, 622 with an offset and a duration. A playlist may be stored as a composition asset in an XML file and be referenced by an ID from a composition. Any application that is able to parse a media project may also parse an interoperable composition asset. The application may then recreate the interoperable composition into its own form using the project synchronization SDK, translating the tracks, clips, and media references into its own proprietary composition form. After editing the composition, the application can use the SDK to write a new version of the interoperable composition in addition to, or instead of, its proprietary version. Using this mechanism, a diverse set of creative applications may be used to make changes and then produce new deliverables from the original compositions. By parsing the interoperable compositions, applications can identify the physical media assets used in the compositions. If an application is not able to parse the interoperable composition to derive the physical asset references, it can still obtain that information using the project synchronization metadata, which records the physical assets used by the interoperable compositions.

In various embodiments, a media project may be established as a framework before compositions and/or media are present. For example, no compositions may be present at the start of a media project when media ingest operations have commenced before a full edit or mix has been made.

In one scenario, a cloud-based collaborative synchronized media project may be set up in which media is being captured and pushed to the cloud, while an editor synchronizes the available media from the cloud to his local synchronized media project and starts editing using the available media. The editor may then push a version of the local composition to the cloud-based media project where it is synchronized as applicable to the cloud-based media project and also to other clients so collaborators may review it and/or perform further editing.

In another usage case, as part of pre-production, a version of a composition may be generated before any media is present as part of a story-boarding phase in which dummy edits without media are placed on a "flat" timeline. The timeline is placed into a local synchronized media project and synchronized to the cloud. This, in turn, may trigger media ingest, either via action by a collaborator, or via an automated ingest process. An example of an automated ingest process involves retrieving from a cloud archive all media that matches an ID of the clips in the timeline. After ingest in the cloud, the media may be synchronized with the client editor's local synchronized media project, depending on the synchronization mode designated for the editor's media project.

At any point during the editing of a synchronized media project, a consolidation operation may be performed. This serves to copy all the assets required for the project to a given instance of the project, e.g., onto a client local to a user. Retrieved assets may include assets in the back end/ cloud server, such as server 202 (FIG. 2), as well as assets on other clients that had not been copied locally in accordance with a synchronization mode specified for a synchronized media project. For example, if consolidation was being performed on Client A (FIG. 2, 204), and synchronized media project 208 referenced an asset on registered synchronized media project 228 located on Client B (206), consolidation would cause the asset to be copied to synchronized media project 208 via server 202. After consolidation, the synchronized media project may be packaged up and forwarded electronically, or copied onto portable storage media, such as solid state memory, an optical drive, or a magnetic drive for distribution to other locations and/or for downstream production.

Figure 7:
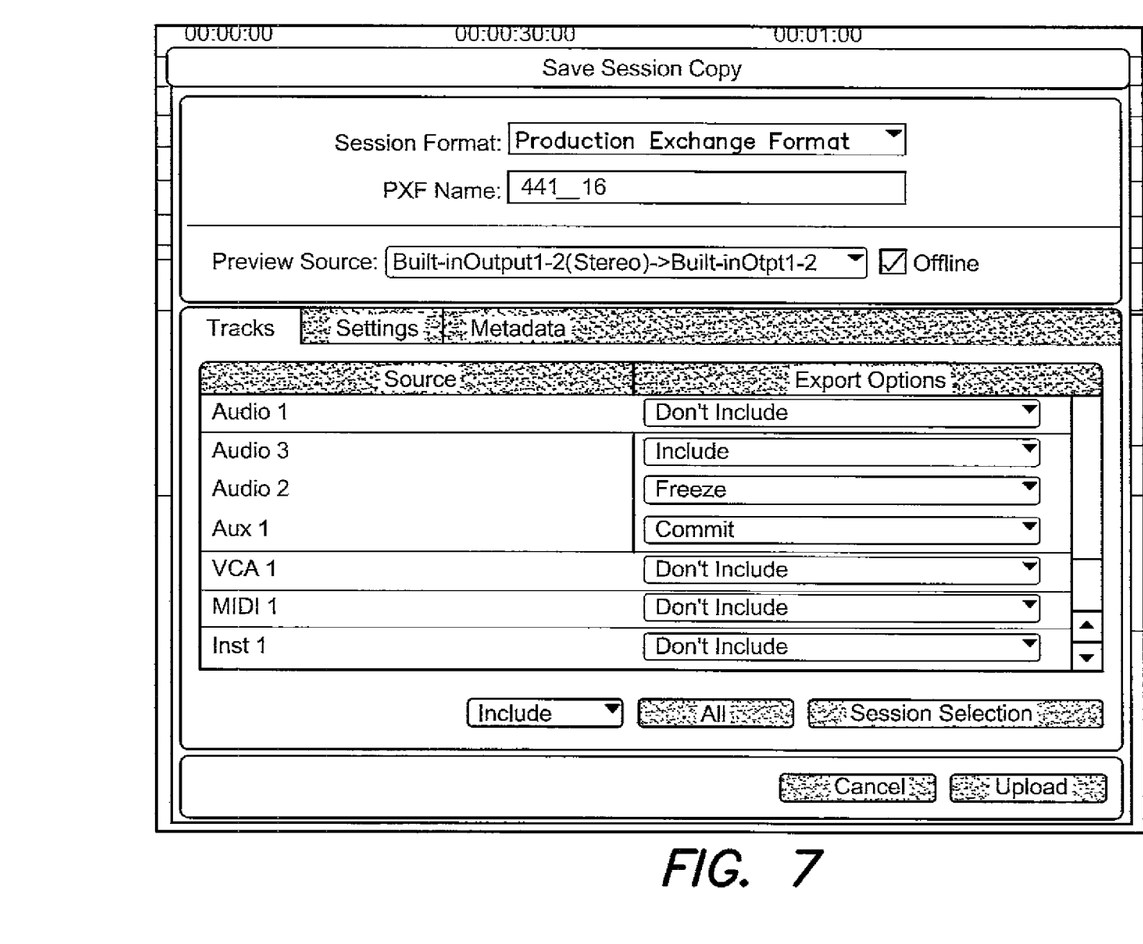
FIG. 7 is a diagrammatic screen shot of a user interface for generating an interoperable composition from a proprietary composition.

When rendering a version of a proprietary composition into an interoperable composition, a user is presented with an interface, such as that illustrated in FIG. 7, enabling the user to select the components (i.e., tracks in the illustrated example) to be included, and also to specify the form of the included tracks. For each track, the user may specify whether the track is: not to be included; to be included in an interoperable format; to be included and frozen; or to be included and committed.

The "include" option causes a track to be rendered in an interoperable format. This is a lossy process, in which only raw media files are copied into the rendered track. The rendered track only supports playlists within the tracks that reference clips that reference media files. Other kinds of data, such as effects, automation, or routing are not supported and are discarded in the conversion process.

The "freeze" option causes all the data on the original track to be rendered into an audio or a video file. The original track and media data are retained, but effectively hidden. This conversion is not lossy, in that a track may be "unfrozen," a process that unhides the original track and media data and deletes the rendered media file. Freezing a track is useful when sharing a proprietary data model with a collaborator who does not have an audio processing plug-in that may not be installed by default with the application and that is used on that track. The receiving application is able to use the rendered media file to play back the track, while the data required for the proprietary data model is present in the background for future use with collaborators equipped with the necessary plug-ins.

As with the freeze option, the "commit" option also renders the entire track and media data to a media file, but a new track referencing those media files only is created. The various kinds of track and media data used to render the file are not copied into the newly created track and are discarded. The rendering only supports tracks and playlists within the tracks that reference media files.

Figure 8:
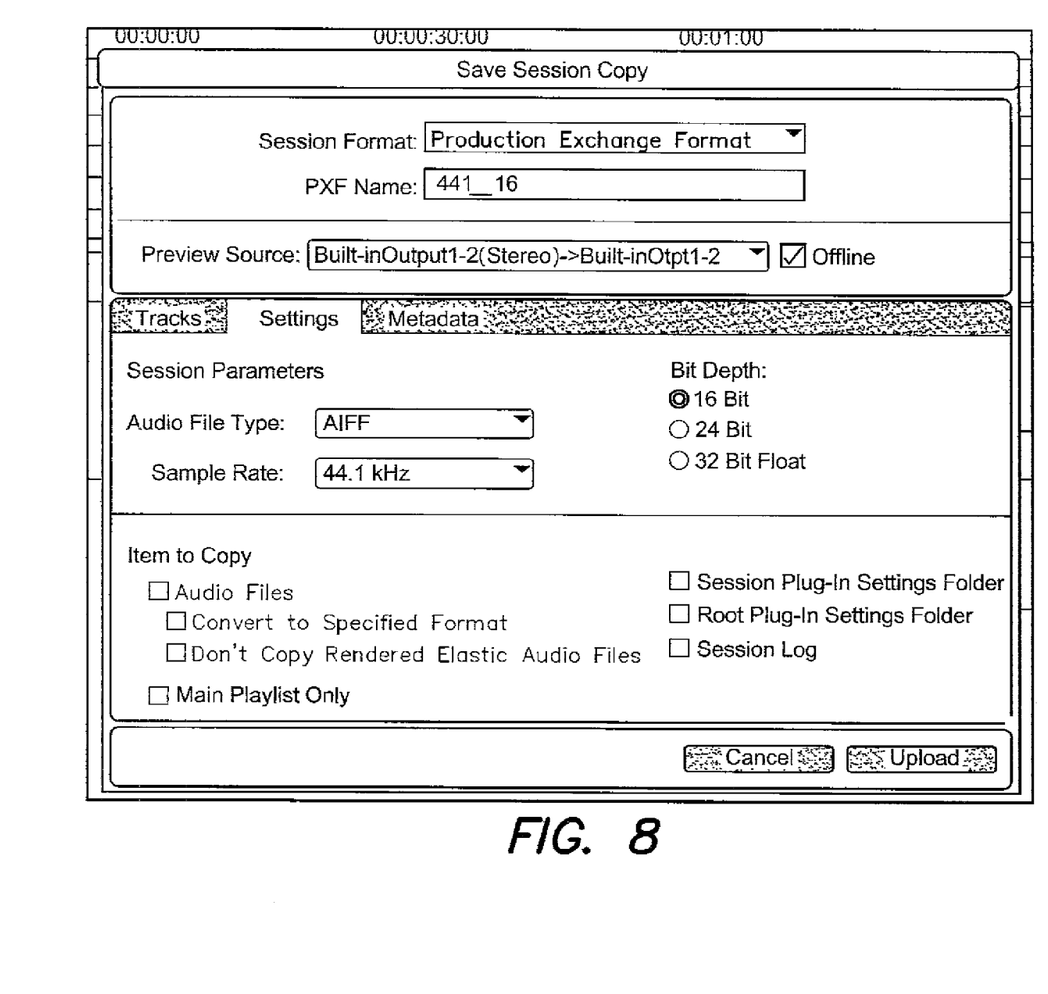
FIG. 8 is a diagrammatic screen shot of a user interface for selecting various settings for an interoperable composition.
Figure 9:
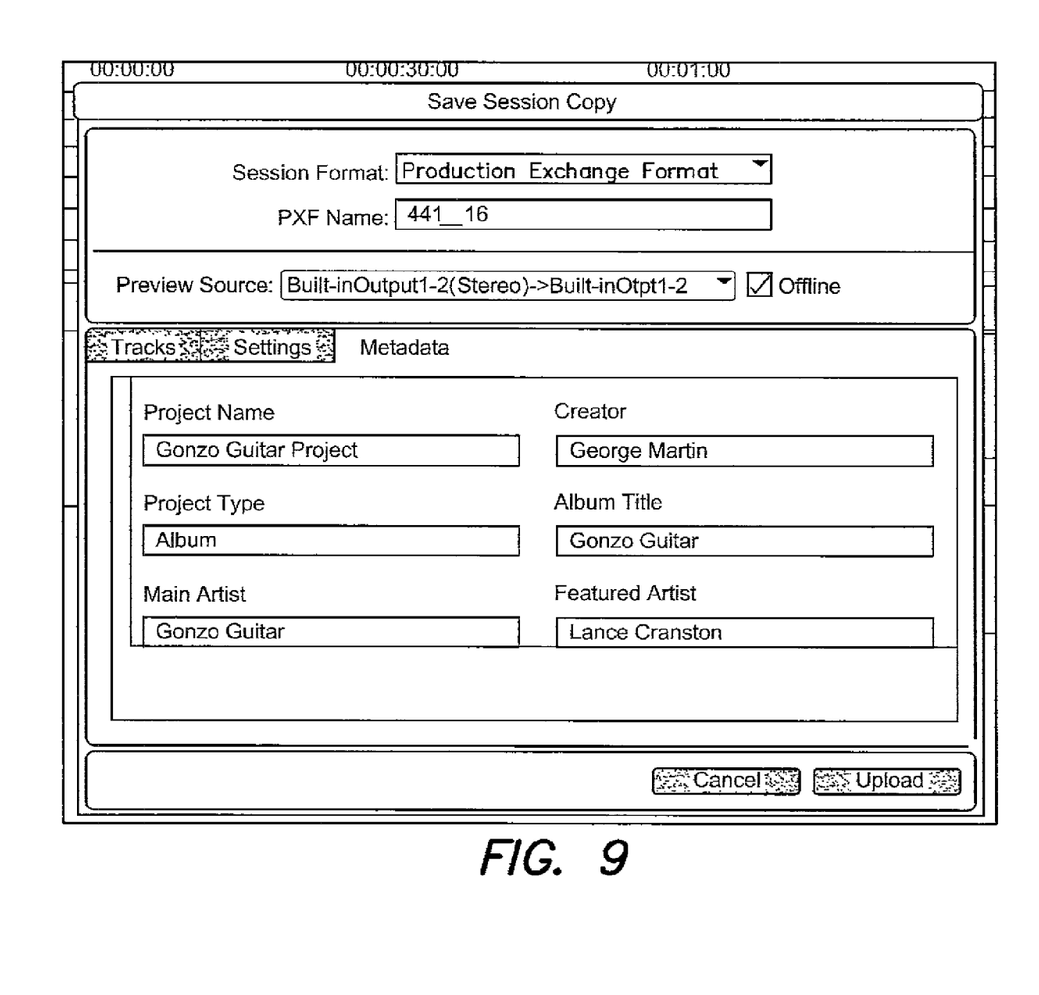
FIG. 9 is a diagrammatic screen shot of a user interface for adding metadata to an interoperable composition.

In addition, a user may be given an opportunity to select settings, such as sample rate, bit depth, and audio file type, as illustrated in FIG. 8. The user may also be given the opportunity to include additional metadata to be associated with the simplified version, such as project name, project type, main artist, creator, album title, and featured artist, as shown in FIG. 9.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

In a remote server or cloud-based deployment, the computer system may be implemented on one or more remote servers on a network. The clients may be connected to the one or more servers via a wide area network.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three.

The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a media project that is at least partially stored on a client, the media project comprising at least one of a composition asset and a media asset, the method comprising:
    enabling a user of an application running on the client to use the application to edit the media project, wherein the application communicates with the media project via a software development kit, and wherein the application is able to edit the media project independently of an internal organization of the media project; and
    designating a synchronization mode for the media project that specifies whether:
        composition assets are to be stored on the client and not on a server, or stored on the server and not the client, or copies of the composition assets are to be stored on both the client and on the server; and
        media assets are to be stored on the client and not on the server, or stored on the server and not the client, or copies of the composition assets are to be stored on both the client and on the server;
    providing a bidirectional project synchronization service, wherein the designated synchronization mode specifies whether the bidirectional synchronization service:
        maintains synchrony between client and server copies of the one or more composition assets; and
        maintains synchrony between client and server copies of the one or more media assets; and
    wherein the application running on the client works with composition assets and media assets of the media project without being aware of an actual location of the composition assets and the media assets.

2. The method of claim 1, wherein the media project includes a composition asset in a format that is proprietary to the application.

3. The method of claim 1, wherein the media project includes a composition asset in an interoperable format.

4. The method of claim 1, wherein the synchronization mode is changed automatically when at least one of:
    the client is connected to a network after being disconnected from the network; and
    the client is disconnected from a network after being connected to the network.

5. The method of claim 1, further comprising enabling a user of an application running on a second client to use the application to edit a copy of the media project that is at least partially stored on the second client, wherein the copy of the media project is synchronized to the first-mentioned media project via the server using the synchronization service in accordance with a synchronization mode designated for the copy of the media project.

6. The method of claim 1, wherein the designated synchronization mode specifies that media assets are to be stored on the server and not on the client, further comprising streaming a media asset to the client when the media asset is required by the application.

7. The method of claim 1, further comprising streaming a media asset to the client when the media asset is required by the application but is not present on the client.

8. The method of claim 1, wherein the media project includes a plurality of versions.

9. The method of claim 1, wherein the interoperable compositional asset references a playlist.

10. The method of claim 1, wherein the application is able to determine whether a media asset is present on the client.

11. A client system comprising:
a memory for storing computer-readable instructions; and
a processor connected to the memory, wherein the processor, when executing the computer-readable instructions, causes the client system to perform a method for editing a media project that is at least partially stored on the client system, the media project comprising at least one of a composition asset and a media asset, the method comprising:
enabling a user of an application running on the client system to use the application to edit the media project, wherein the application communicates with the media project via a software development kit, and wherein the application is able to edit the media project independently of an internal organization of the media project; and
designating a synchronization mode for the media project that specifies whether:
composition assets are to be stored on the client and not on a server, or stored on the server and not the client, or copies of the composition assets are to be stored on both the client and on the server; and
media assets are to be stored on the client and not on the server, or stored on the server and not the client, or copies of the composition assets are to be stored on both the client and on the server;
providing a bidirectional project synchronization service, wherein the designated synchronization mode specifies whether the bidirectional synchronization service:
maintains synchrony between client and server copies of the one or more composition assets; and
maintains synchrony between client and server copies of the one or more media assets; and
wherein the application running on the client works with composition assets and media assets of the media project without being aware of an actual location of the composition assets and the media assets.

12. A computer program product comprising:
a non-transitory computer-readable medium with computer program instructions encoded thereon, wherein the computer program instructions, when processed by a client, instruct the client to perform a method of editing a media project that is at least partially stored on the client, the media project comprising at least one of a composition asset and a media asset, the method comprising:
enabling a user of an application running on the client to use the application to edit the media project, wherein the application communicates with the media project via a software development kit, and wherein the application is able to edit the media project independently of an internal organization of the media project; and
designating a synchronization mode for the media project that specifies whether:
composition assets are to be stored on the client and not on a server, or stored on the server and not the client, or copies of the composition assets are to be stored on both the client and on the server; and
media assets are to be stored on the client and not on the server, or stored on the server and not the client, or copies of the composition assets are to be stored on both the client and on the server;
providing a bidirectional project synchronization service, wherein the designated synchronization mode specifies whether the bidirectional synchronization service:
maintains synchrony between client and server copies of the one or more composition assets; and
maintains synchrony between client and server copies of the one or more media assets; and
wherein the application running on the client works with composition assets and media assets of the media project without being aware of an actual location of the composition assets and the media assets.

\* \* \* \* \*